Patented Nov. 20, 1928.

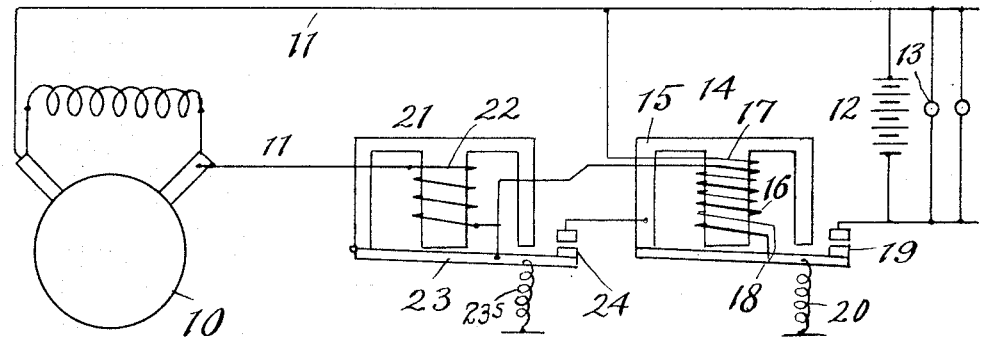
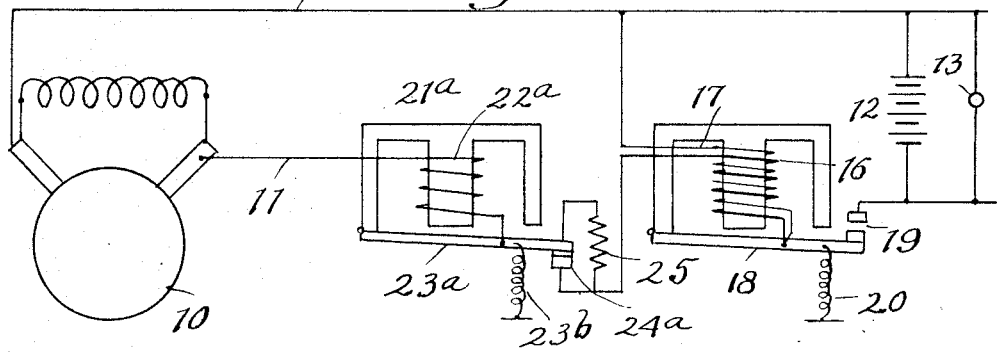
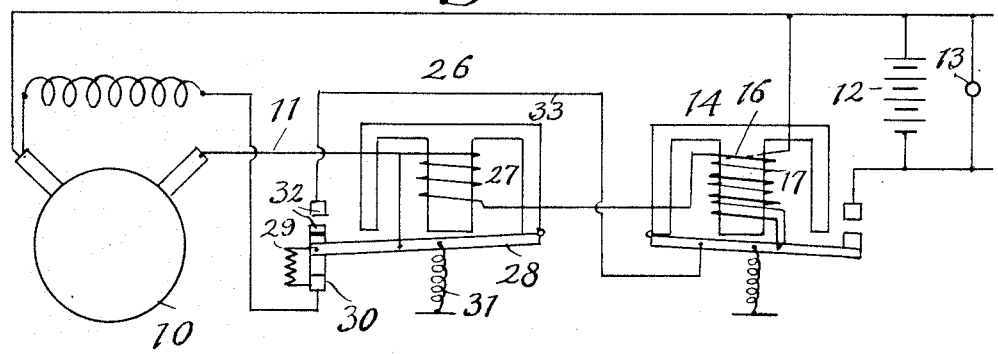

1,692,216

UNITED STATES PATENT OFFICE.

BENNETT M. LEECE, OF CLEVELAND, OHIO, ASSIGNOR TO THE LEECE-NEVILLE COMPANY, OF CLEVELAND, OHIO, A CORPORATION OF OHIO.

REVERSE-CURRENT CUT-OUT FOR VEHICLE LIGHTING AND BATTERY-CHARGING SYSTEMS.

Application filed December 10, 1925. Serial No. 74,457.

This invention relates to lighting and battery charging systems such as are employed on motor vehicles, and particularly to certain improvements in connection with the reverse current cut-out commonly employed in such systems to open the battery-generator circuit and prevent the discharging of the battery when the voltage of the generator becomes less than that of the battery.

My invention finds special utility in large installations, such as the so-called gas-electric cars employing a good sized generator and battery. In such installations there is required also, a large reverse current cut-out or relay, the back series winding of which at times carries a heavy current.

It has been found that with these systems the reverse current cut-out does not always function in the intended manner, this occurring occasionally if the car is subjected to a severe jolt which causes the armature to be accidentally closed, and at other times if the armature has considerable inertia and there is an unusually heavy reverse current through the series coil as might occur if the generator is short circuited, resulting in the armature being held closed by the flux produced by the current passing from the battery through the series coil.

The principal object of the present invention is to insure the intended or proper operation of the reverse current cut-out under the above, and possibly other conditions, and this is accomplished by the provision of an auxiliary protective device, such as an auxiliary magnet or relay, which is adapted to render the series coil of the reverse current cut-out ineffective to hold the armature in closed position when the conditions require it to be open.

The invention may be further briefly summarized as consisting in certain novel combinations and arrangements of parts which will be described in the specification and set forth in the appended claims.

In the accompanying sheet of drawings, Figs. 1, 2 and 3 are diagrammatic views showing a lighting and battery charging system equipped with three slightly different forms or embodiments of the invention.

Referring now to the drawings, and first to Fig. 1, 10 represents the generator which may be a shunt generator, or any other suitable type. The load circuit is indicated by the conductors 11, the battery to be charged being shown at 12 and the lamps at 13. These parts do not directly involve the invention and are therefore shown only conventionally, no attempt being made to show controlling switches and other auxiliary apparatus, such as voltage and current regulators which may or may not be employed.

The reverse current cut-out proper which is designated 14 may be of usual construction, and as here illustrated consists of a core 15 having a series coil 16 and a voltage coil 17 which are arranged to function in the usual manner,—that is to say, when the voltage of the generator reaches a predetermined value, the armature 18 is attracted and the load circuit is closed at the contacts 19, and under normal conditions the armature is opened by a suitable spring indicated at 20 when the generator voltage drops below that of the battery and the current reverses in the series coil 16.

To prevent the armature being held closed by the field produced by the series coil 16 under unusual conditions, such as those mentioned heretofore, I associate with the reverse current cut-out an auxiliary protective device which is employed in conjunction or association with the reverse current cut-out so as to render the series coil ineffective to hold the armature closed when the conditions are such that is should be open. This auxiliary protective device is preferably in the form of a relay or magnet 21 having a few series turns indicated at 22 in the load circuit and in series with the series coil 16 of the reverse current cut-out.

In the embodiment shown in Fig. 1, which is the preferred form, the relay 21 has an armature 23 which is normally held open by a spring $23^s$ or equivalent means, the current passing through the turns 22 being normally insufficient to produce a field so as to attract the armature and close the circuit at the contacts 24. However, if for any reason an unusually heavy current passes from the battery through the coil 16 of the reverse current cut-out and through the coil 22 of the auxiliary protective device, the armature 23 is attracted and the coil 16 is short circuited by the closure of the contacts 24. This insures the immediate release of the armature of the reverse current cut-out and the opening of the circuit.

In the arrangement shown in Fig. 2 there is associated with the reverse current cut-out 14, which is similar to that first described, an auxiliary protective device in the form of a magnet or relay, here designated 21$^a$, which functions in a somewhat different manner to render the series coil ineffective to hold the armature of the cut-out closed when it should be open.

The auxiliary protective device 21$^a$ as in the arrangement first described, has a few turns which are in the load circuit and are in series with the series coil 16 of the reverse current cut-out 14, but in this instance the armature 23$^a$ is normally held in closed position by a spring 23$^b$ or equivalent means, and the contacts 24$^a$ are normally in the load circuit around a resistance 25. The ampere turns of the coil 22$^a$ are under all normal conditions insufficient to attract the armature 23$^a$ and separate the contacts 24$^a$, but if the reverse current cut-out fails to open on a reversal of current, and there is a sufficient flow of current from the battery through the series coil 16 of the cut-out to hold the armature closed, the armature 23$^a$ will be attracted by the flux produced by the current passing through the coil 22$^a$, with the result that the resistance 25 is thrown into the circuit in series with the coil 16, and this so reduces the value of the current passing through the latter that the armature of the cut-out 14 is released and the circuit is opened at the contacts of the cut-out.

In neither case, i. e. neither with the arrangement shown in Fig. 1, nor with that shown in Fig. 2 will the auxiliary protective device come into action under normal conditions, for normally when the current reverses in the series coil of the cut-out, the latter will function in the intended manner, and open the circuit until the generator voltage again exceeds that of the battery when it will again close the circuit, but if the armature of the cut-out should be closed by vibration, as has been known to occur at times, for example when the car having the equipment on it is jolted in coupling one car to another, or if the generator should be accidentally short circuited, the voltage of the battery would not be opposed by the voltage of the generator, and there would be a heavy rush of current from the battery through the series coils of the cut-out and of the auxiliary protective device, and under both circumstances mentioned, the armature of the cut-out might be retained in closed position by the ampere turns of the series coil of the cut-out if my improved protective device were not employed. However, by the provision of this protective device which in one instance short circuits the series coil of the cut-out and in the other instance inserts a resistance in series with it, the series coil of the cut-out is prevented from holding the armature closed.

In Fig. 3 I have shown a system similar to those described above, but wherein the current regulator serves under abnormal conditions such as those mentioned above, as the auxiliary protective device which co-operates with the reverse current cut-out 14 to insure the opening of the circuit. The current regulator, designated 26, is in the form of a magnet having a core with series turns 27 which are preferably between the generator and the series turns 16 of the cut-out 14, and it includes also an armature 28, which when the current of the generator exceeds a predetermined value, is attracted so as to cut into the field circuit of the generator a resistance 29 which in this instance is connected between contacts 30, normally held closed by a spring 31 acting on the armature. The regulator will function in the usual manner to maintain the current output of the generator substantially constant by varying the field excitation.

In accordance with my invention I provide on the current regulator 26 a pair of auxiliary contacts 32 which are normally open when the armature 28 is stationary, and when it vibrates during the normal functioning of the current regulator, but when there is a heavy rush of battery current through the coil 27 of the regulator, as under the conditions mentioned above, the contacts 32 are closed, due to the fact that the attractive force on the armature 28 is then much greater than normal. The closure of the contacts 32 serves to reduce the current passing through the series coil 16 of the cut-out 14 in either of the ways illustrated in connection with Figs. 1 and 2, or in some equivalent manner, but in this instance the closure of the contacts 32 short circuits the series coil 16 through the medium of a conductor 33 connected to one of the contacts 32. This insures the opening of the battery generator circuit in the manner already explained in connection with Figs. 1 and 2.

It will be understood that there may be other conditions than those mentioned above, which would cause the reverse current cut-out to fail to function in the intended manner, and on the occurrence of which, my auxiliary protective device will have utility in insuring the opening of the reverse current cut-out, and thereby prevent discharge of the battery.

While I have illustrated three slightly different embodiments or ways of carrying out my invention, I do not desire to be confined to the arrangements shown, as other ways of carrying out the principle of my invention may occur to one skilled in the art. I therefore aim in my claims to cover all modifications which do not involve a departure from the spirit and scope of my invention as defined in the appended claims.

Having described my invention, I claim:

1. In a system such as described, a generator, a battery adapted to be connected thereto, a reverse current cut-out between the generator and battery and comprising a movable switch member and series and voltage coils, and means for preventing the switch member being held in closed position by the passage of heavy battery current through the series coil comprising a switch responsive to a flow of battery current for reducing the ampere turns of the series coil.

2. In a system such as described, a generator, a battery adapted to be connected thereto, a reverse current cut-out between the generator and battery and comprising an armature and series and voltage coils, and means associated with the cut-out and comprising a switch responsive to passage of current therethrough for reducing the ampere turns of the series coil of the cut-out.

3. In a system such as described, a generator, a battery adapted to be connected thereto, a reverse current cut-out between the generator and battery comprising a magnet having an armature and series and voltage coils, and an auxiliary magnet comprising an armature and a series coil serving on the passage of a predetermined current through its coil to reduce the current passing through the series coil of the first-named magnet.

4. In a system such as described, a generator, a battery adapted to be connected thereto, a reverse current cut-out between the generator and battery and comprising an armature and series and voltage coils, and means responsive to the passage of predetermined battery current therethrough for short circuiting the series coil of the cut-out.

5. In a system such as described, a generator, a battery adapted to be connected thereto, and means for opening the generator-battery circuit upon the reversal of current in the system comprising two magnets, one serving independently of the other to open the circuit upon the reversal of current when the voltage of the battery is opposed by the voltage of the generator, and the second responsive to a flow of relatively heavy battery current and insuring the opening of the circuit when the voltage of the battery is substantially unopposed by generator voltage.

In testimony whereof, I hereunto affix my signature.

BENNETT M. LEECE.